US009864995B2

United States Patent
Sandei et al.

(10) Patent No.: US 9,864,995 B2
(45) Date of Patent: *Jan. 9, 2018

(54) SYSTEM AND METHOD FOR MEANING DRIVEN PROCESS AND INFORMATION MANAGEMENT TO IMPROVE EFFICIENCY, QUALITY OF WORK, AND OVERALL CUSTOMER SATISFACTION

(71) Applicant: Almawave S.r.l., Rome (IT)

(72) Inventors: Valeria Sandei, Rome (IT); Raniero Romagnoli, Rome (IT); Diego Di Curzio, Rome (IT); Guglielmo Nigri, Rome (IT); Giordano Maestro, Rome (IT); Simone Folino, Rome (IT)

(73) Assignee: ALMAWAVE S.R.L., Rome (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/139,514

(22) Filed: Apr. 27, 2016

(65) Prior Publication Data
US 2016/0350764 A1 Dec. 1, 2016

Related U.S. Application Data

(63) Continuation of application No. 14/450,085, filed on Aug. 1, 2014, now Pat. No. 9,348,814.

(51) Int. Cl.
G06Q 30/00 (2012.01)
G06F 17/27 (2006.01)
H04M 3/51 (2006.01)
G06Q 10/06 (2012.01)
G06Q 10/10 (2012.01)

(52) U.S. Cl.
CPC ....... *G06Q 30/016* (2013.01); *G06F 17/2785* (2013.01); *G06Q 10/0631* (2013.01); *G06Q 10/063118* (2013.01); *G06Q 10/10* (2013.01); *H04M 3/5191* (2013.01)

(58) Field of Classification Search
CPC ................................................ G06F 17/2785
USPC ............................................................ 704/9
See application file for complete search history.

(56) References Cited

U.S. PATENT DOCUMENTS 9,348,814 B2 * 5/2016 Sandei ................ G06F 17/2785

* cited by examiner

*Primary Examiner* — Susan McFadden
(74) *Attorney, Agent, or Firm* — Venable LLP; Frank M. Gasparo; William A. Hector

(57) ABSTRACT

Customer contact handling at a customer service system. Contact text and contact metadata is received from a user communication device. Semantic characteristics of the contact text are determined based on semantic analysis of the contact text. A user profile is identified based on the contact metadata. User data associated with the identified user profile is retrieved. A contact need classification is determined based on the semantic characteristics and user data. A service agent profile from a plurality of service agent profiles is selected based on one or more of the contact need classification, semantic characteristics, and the user data. Contact event data is provided to an agent communication device associated with the selected agent profile.

20 Claims, 11 Drawing Sheets

SYSTEM AND METHOD FOR MEANING DRIVEN PROCESS AND INFORMATION MANAGEMENT TO IMPROVE EFFICIENCY, QUALITY OF WORK, AND OVERALL CUSTOMER SATISFACTION

CROSS-REFERENCE TO RELATED APPLICATION

This application is a continuation of co-pending U.S. patent application Ser. No. 14/450,085, entitled SYSTEM AND METHOD FOR MEANING DRIVEN PROCESS AND INFORMATION MANAGEMENT TO IMPROVE EFFICIENCY, QUALITY OF WORK AND OVERALL CUSTOMER SATISFACTION filed Aug. 1, 2014, which is incorporated herein by reference for all purposes.

BACKGROUND

For many companies, addressing the needs and concerns of its customers is important to the business process. For example, customers may want to purchase goods or services, change customer account features, voice a complaint, ask a question about the goods or services, or troubleshoot an issue with the goods or services. However, the way that customers interact with companies has become more complex, diverse and rapidly changing. For example, instead of relying primarily on phone calls or mail, customers now also expect to interact with companies via e-mail, text messaging, and online social media like Twitter and Facebook.

To cope with this new landscape of multi-channel customer contacts, and remain competitive in the marketplace, companies must adopt increasingly advanced marking and operations tools, information governance, and customer engagement systems. For companies with a large number of customers, a call center or service center may be used to handle large volumes of customer contacts that are received continuously. Some businesses have in-house service centers; whereas, others outsource service center needs to an outside vendor. In either case, service centers may employ a number of service agents that attend to customer needs and handle contact events.

Conventionally, service agents can be tasked with handling a wide variety of customer needs and customers, which is undesirable because it requires each service agent to receive training on handling many customer needs. Unfortunately, this often results in the service agents having only minimal proficiency in servicing any given customer need.

Some service systems allow for users to indicate their needs via an interactive voice response (IVR) system that allows users to select menu items via voice or by dual-tone multi-frequency (DTMF) tones that are generated by a phone or other device. However, many users incorrectly indicate their needs or simply override the menu and request immediate connection to a service agent (e.g., by pressing "0" or saying "speak to agent"). Accordingly, user needs are largely unknown when an agent receives a contact event, and service agents must still be capable of handling a wide variety of customer needs.

Customer relationship management (CRM) tools are increasingly used to handle the flood of customer contacts that a company receives, and such systems are largely deficient because they are unable to handle the increased complexity created by multi-channel contacts and such systems are unable to efficiently interact with the wide variety of outdated legacy systems associated with each given company. Moreover, conventional CRM systems are unable to efficiently assist customer service agents with handling customer contacts because conventional CRM systems are unable to understand the meaning of customer requests and are therefore unable to effectively aid customer service agents in addressing customer needs. In other words, conventional CRM systems cannot adequately identify and classify customer needs or issues and therefore cannot automatically improve the process of handling customer contacts without operator intervention.

In view of the foregoing, a need exists for an improved customer service system and method in an effort to overcome the aforementioned obstacles and deficiencies of conventional customer service systems.

BRIEF DESCRIPTION OF THE DRAWINGS

FIG. 1b is a block diagram illustrating an embodiment of the system server of FIG. 1a.

FIGS. 2-4 are exemplary detailed network diagrams illustrating an alternative embodiment of the customer service system of FIG. 1a.

Figure 1A:
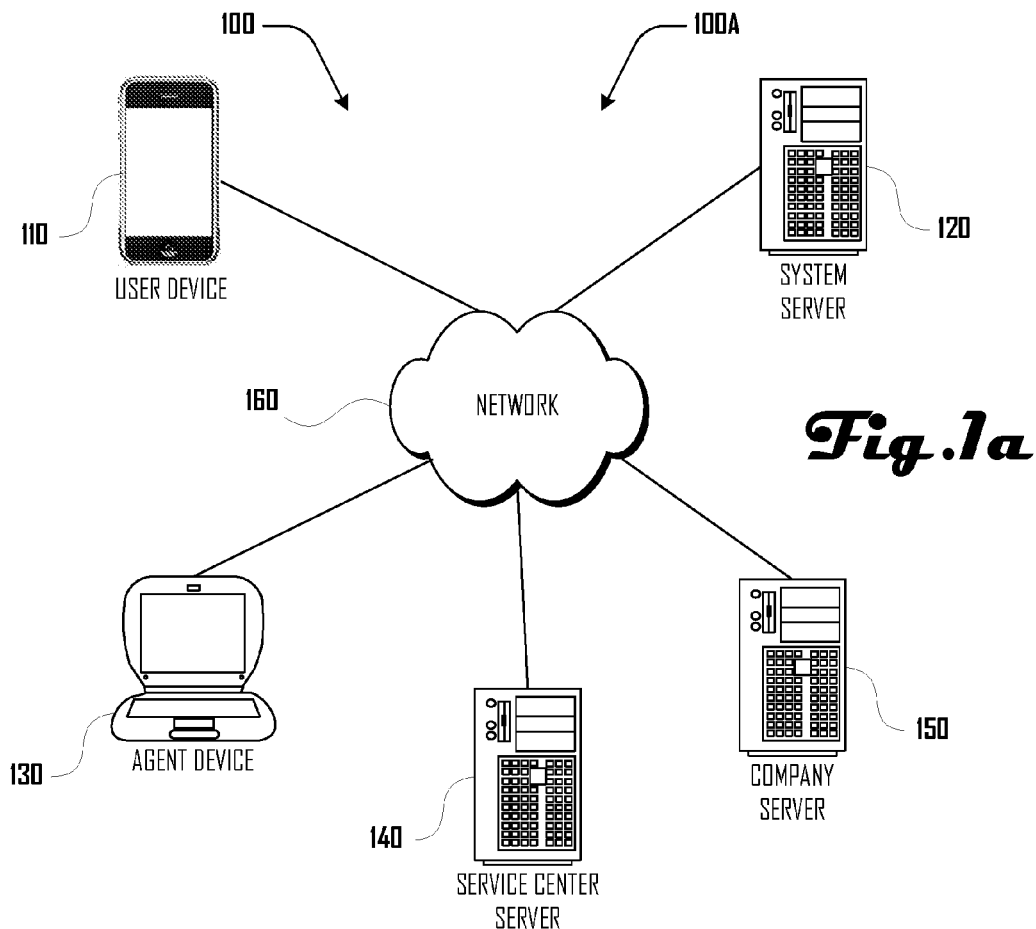
FIG. 1a is an exemplary top-level network diagram illustrating an embodiment of a customer service system, wherein the customer service system includes a system server, a user device and an agent device.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available customer service systems are unable to adequately determine customer needs and select most-qualified agents to address the specific needs of customers, a customer service system that leverages intelligent and continuous semantic analysis and determination of customer needs can prove desirable and provide a basis for a wide range of customer service applications, such as providing enhanced guidance and resources to service agents and providing an enhanced ability to select service agents that are best suited to handle specific customers and specific customer needs. For example, there is a need for novel customer service systems that can efficiently manage and leverage conventionally separate tools such as semantics, statistics, intelligent business process management, and automatic speech recognition. Additionally, there is a need for innovative people-centered technology that improves experiences and outcomes for customers and service agents alike. This result can be achieved, according to one embodiment disclosed herein, by a customer service system 100 as illustrated in FIG. 1.

Turning to FIG. 1, the customer service system 100 is shown in one embodiment 100A as comprising a user (or customer) device 110, a system server 120, an agent device 130, a service center server 140 and a company server 150 that are operably connected via a network 160. Although shown and described as including a user device 110, a system server 120, an agent device 130, a service center server 140 and a company server 150 with reference to FIG. 1*a* for purposes of illustration only, the customer service system 100 can include any suitable combination of the user device 110, system server 120, agent device 130, service center server 140 and/or company server 150. Additionally, and/or alternatively, in further embodiments, the customer service system 100 can include a plurality of any of the user device 110, system server 120, agent device 130, service center server 140, and/or company server 150.

In various embodiments, the customer service system 100 may be used to support customer contact centers for various companies. For example, suppose there is a plurality of separate companies that provide competing cable television services, and each of these companies needs to handle calls from customers to resolve various customer service issues. Each company can have an in-house customer contact center that handles calls, e-mails, text messages and other communications from a plurality of customers, or such services may be handled by one or more outside vendor. The cable television companies may have one or more company server 150, and the service centers may have one or more service center server 140. Alternatively, there may be a plurality of service centers that each has one or more service center server 140. Additionally, a given service center may have a plurality of service agents who work at one or more agent device 130. Customers may have one or more user device 110. For example, a given customer may have both a smartphone and a tablet computer that could alternatively be used to communicate with the system server 130. Additionally, one or more system server 120 may facilitate communications and handle data as discussed herein among any of the user devices 110, company servers 150, service center servers 140 and/or agent devices 130.

Although the user device 110 is depicted as being a cellular telephone for purposes of illustration only, the user device 110 may be any suitable device in various embodiments, including a smart-phone, laptop computer, desktop computer, smart-watch, tablet-computer, e-reader device, gaming device, television, headset computing device, or the like.

Similarly, although the agent device 130 is depicted as a laptop computer for purposes of illustration only, the agent device 130 likewise may be any suitable device including a smart-phone, laptop computer, desktop computer, smart-watch, tablet-computer, e-reader device, gaming device, television, headset computing device, or the like. In some embodiments, a plurality of agent devices 130 may be located together in physical location as in a conventional service center; however, in further embodiments, agent devices 130 may be located in disparate locations compared to each other. Agent devices 130 may be associated with a single service center server 140 in some embodiments, but may not be in further embodiments.

The servers 120, 140, 150 may be any suitable server or group of servers in various embodiments and can include a cloud-based server system. In some embodiments, the company server 150 and service center server 140 may be at least partially integrated into the same server and/or perform any functions of the other as described herein. Similarly, the system server 120 may perform the functions of one or both of the service center server 140 and/or company server 150. Stated somewhat differently, the service center server 140 and/or company server 150 may be absent in some embodiments.

The network 160 may comprise one or more suitable networks in various embodiments, including wireless and/or wired networks that can include the Internet, a Wi-Fi network (i.e., an IEEE 802.11x wireless network), a Local Area Network (LAN), Wide Area Network (WAN), a near-field network, a telephone network, a cellular telephone network, or the like. Additionally, in some embodiments, devices and servers discussed herein can be connected in any suitable way and/or in any conventional manner. For example, in an embodiment where a plurality of agent devices 130 are located at a physical location, these agent devices 130 may be operably connected to a service center server 140 via a LAN, and the service center server 140 may be connected to the Internet or other suitable networks.

Figure 1B:
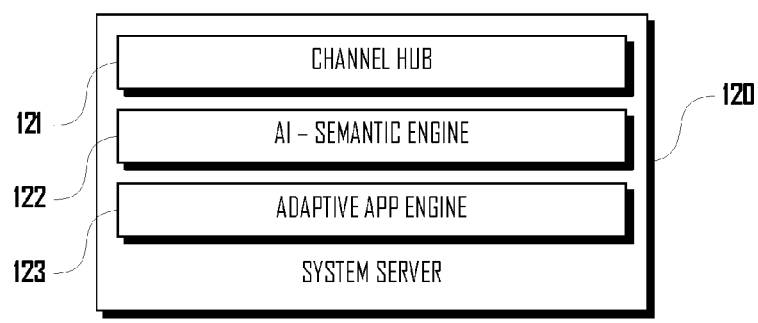
Figure 2:
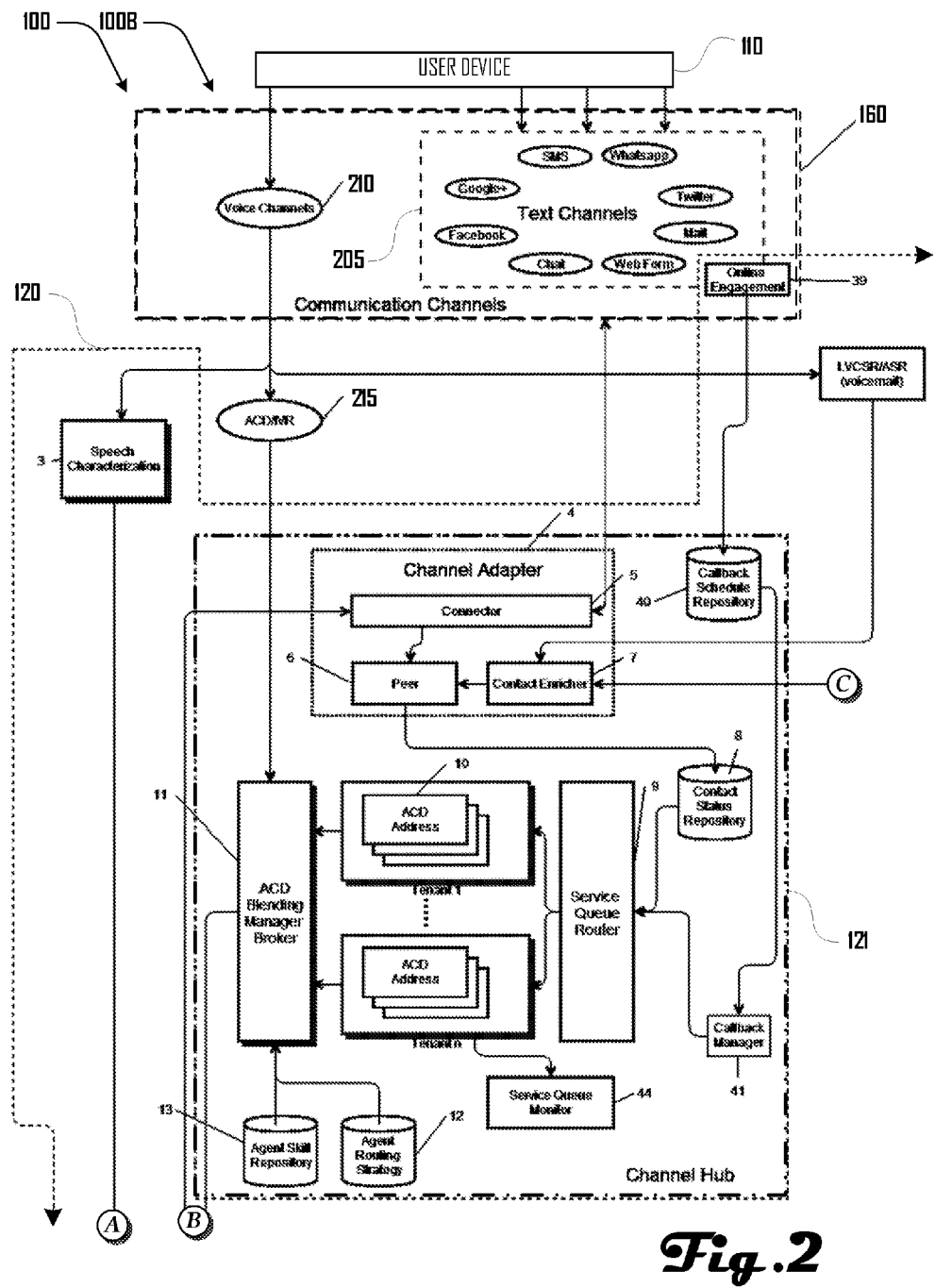
Figure 3:
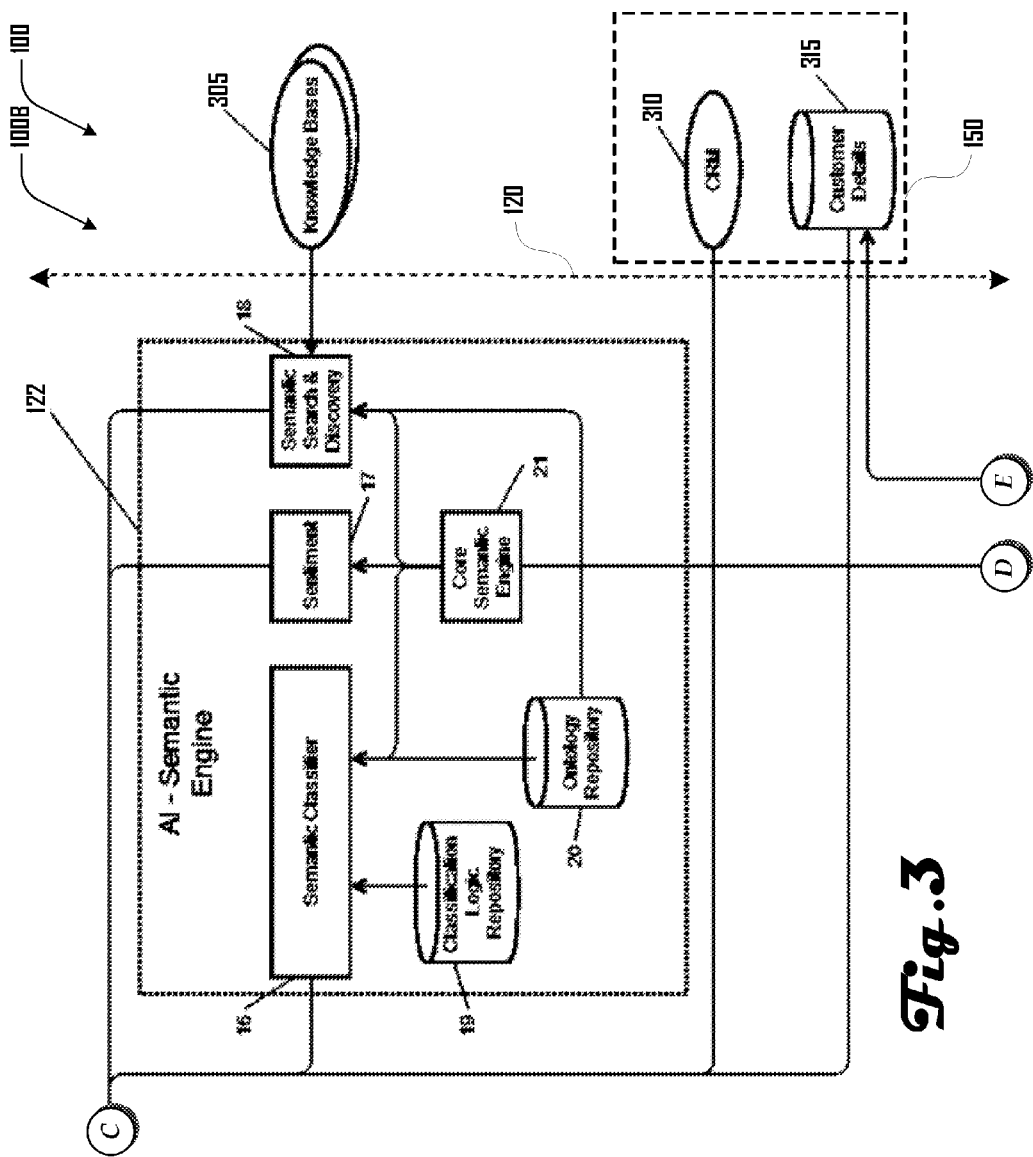
Figure 4:
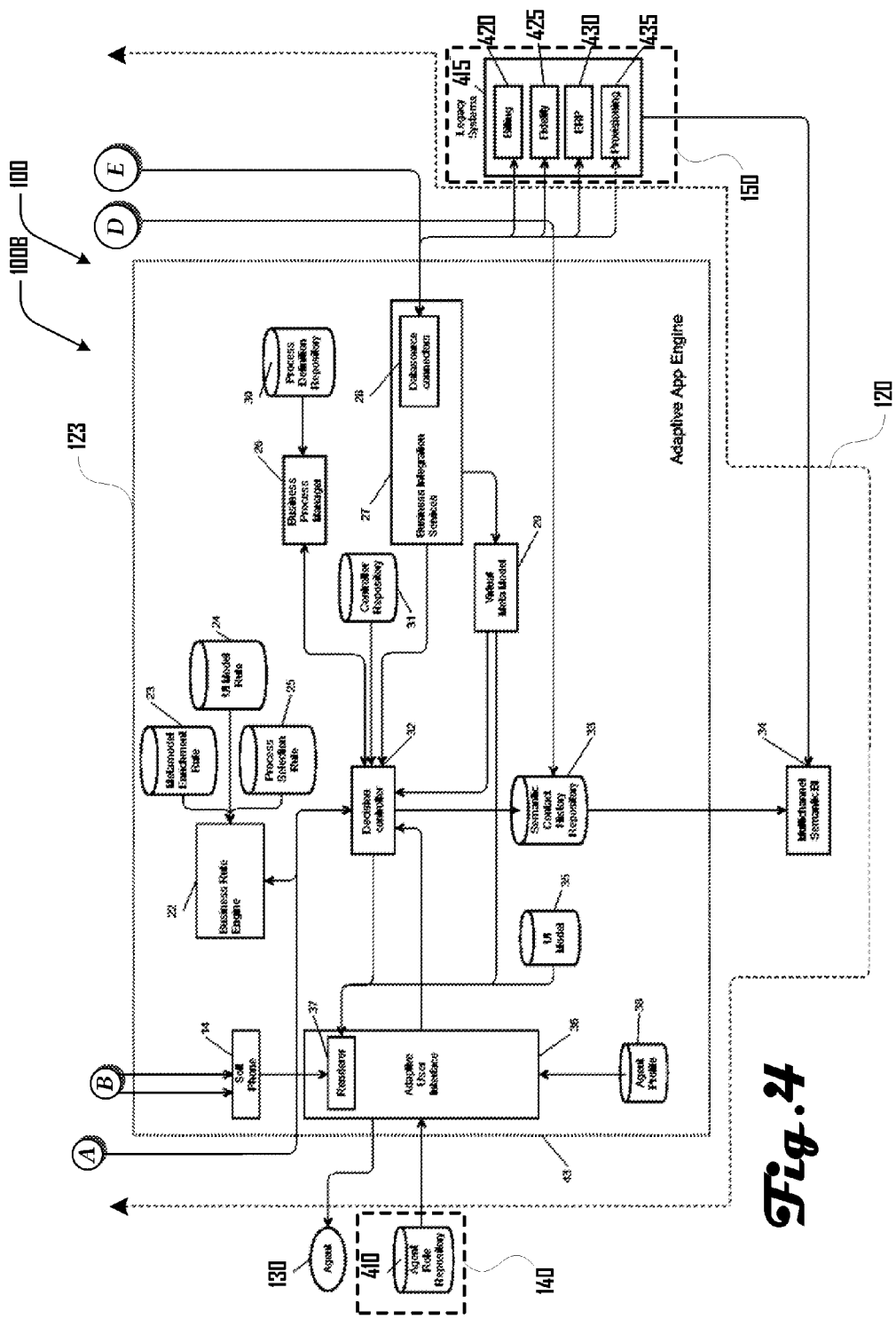

A system server 120 can be operable to perform any of the functions described herein in any suitable way, in any suitable configuration. One non-limiting example embodiment of a system server 120 is depicted in FIG. 1*b*. Turning to FIG. 1*b*, the server system 120 is shown as comprising a channel hub 121, a semantic engine 122, and an adaptive app engine 123. FIGS. 2-4 illustrate another embodiment of the customer service system 100 and depict the interconnectivity of various modules and databases that can be present in the customer service system 100B.

For purposes of clarity, the customer service system 100B is broken into three portions in FIGS. 2-4, respectively, with connections and relationships spanning between the figures. For example, circle elements A and B in FIG. 2 indicate connection with circle elements A and B in FIG. 4; circle element C in FIG. 2 indicates connection with circle element C in FIG. 3; and circle elements D and E in FIG. 3 indicate connection with circle elements D and E in FIG. 4.

Additionally, the system server 120 is depicted in FIGS. 2-4 encompassed by a dashed line having arrow heads that indicate continuation and connection of the line in respective figures, and having a connectivity relationship corresponding to the circle elements A-E discussed above. Accordingly, databases, components and modules that make up the system server 120 are defined by the line that spans FIGS. 2-4 as described in further detail herein.

Accordingly, as depicted in FIGS. 2-4 collectively, the system server 120 can interact with one or more communication channels 205, 210 that are included in the network 160 (FIG. 1). For example, the user device 110 can communicate with the system server 120 via text channels 205 that can include short message service (SMS), Whatsapp (www.whatsapp.com), Twitter (www.Twitter.com), e-mail, a web form, text chat, Facebook (www.Facebook.com), Google+ (plus.google.com), or the like. The user device 110 can alternatively communicate with the system server 120 via voice channels 210.

In some embodiments, the system server 120 can host an online engagement portal 39, through which a user device 110 can directly interact with the system server 120 via the Internet. For example, the online engagement portal 39 can be operable to support online chat communication and can also be configured to provide for scheduling for a callback or other contact via a preferred communication channel through interaction with a callback schedule repository 40.

The callback schedule repository 40 can be connected to a callback manager module 41 that is configured to contact (or attempt contact with) a user device 110 according to schedules defined by a callback schedule repository 40, which can transfer the contact event or attempted contact to a service queue router 9. For example, a customer can employ a user device 110 to request a customer service contact, and the customer can define a preferred contact method, which can be via phone, e-mail, text, Twitter, or the like. The system server 120 can then select a customer service agent to perform this requested contact and facilitate an agent device 130 (FIGS. 1a and 4) in handling this requested contact as discussed herein.

Communication between the system server 120 and user device 110 can be realized by a module channel adapter 4, which can comprise a connector module 5, a peer module 6, and contact enrichment module 7. The connector module 5 can be responsible for consuming communication data from various communication channels of the network 160 and convert such data into events for the peer module 6. The connector module 5 can use different strategies such as polling and streaming, depending on the specific communication channel 205, 210 of the network 160 or the type of communication data type generated. In some embodiments, the connector module 5 represents the first component that interfaces with one or more of the various communication channels 205, 210 of the network 160 using APIs exposed by the specific channel platform.

In some embodiments, the connector module 5 is responsible for maintaining open text communication between a softphone 14 and the communication channels 205, 210 to facilitate the communication with the user device 110. For example, the softphone 14 can be a software module configured for making telephone, cellular or Voice-Over-IP (VOIP) calls over the network 160 instead of using a hardware component, or can use a software module to communicate with text channels 205 in a uniform way.

The peer module 6 can be responsible for adapting communication events provided by the connector module 5 and can create contact events and store such contact events into a contact status repository 8. For example, if a user (or customer) sends an SMS text message to the system server 120, this SMS text message can trigger the generation of a contact event. In other words, when a customer contacts the system server 120 via a user device 110, a contact event can be generated that allows for a service agent to respond via an agent device 130 (FIGS. 1a and 4).

Contact events can be enriched with suitable data, as discussed herein, by a contact enricher 7, which can be configured for treating, adding to, or augmenting communication data and applying an enrichment process before making such data available to other modules. Enrichment can comprise identifying a user profile associated with a contact event. User data can include one or more of a user name, purchase history, payment history, account balance, user preferences, user age, user location, or the like. Such user data can be associated with the contact event and can be included as a portion of contact event data. For example, if a user sends an SMS text message to the system server 120, contact data may initially only include the text from the message and an identifier, such as a phone number, of the sender. Enrichment of such contact data can include identifying a user profile based on the phone number or information provided in the text of the message. Accordingly, information associated with the user profile can be included in contact data and used by the system server 120 to assist a service agent in better responding to the issue or question provided in the text message.

In some embodiments, enrichment can comprise obtaining data from a company server 150 or other server that is outside the system server 120. As depicted in FIG. 4, a company server 150 can include legacy systems 415 such as a billing module 420, a fidelity (or loyalty program) module 425, an Enterprise Resource Planning (ERP) module 430 and/or a provisioning module 435. Additionally, as depicted in FIG. 3, a company server 150 can comprise a Customer Relationship Management (CRM) module 310 or customer details database (or application) 315.

For example, as discussed herein, the system server 120 can support a plurality of companies by supporting customer contact centers for the plurality of companies. However, each company can have separate systems that store data that may be leveraged by the system server 120. Accordingly, in some embodiments the system server 120 can interface with one or more company server 150 associated with a given company. Company servers 150 can store proprietary information about the company's customers and the internal processes of the business. Such information can be accessed by the system server 120 as necessary.

The enrichment process can involve systems such as a semantic classifier 16 and/or sentiment module 17 that are part of the semantic engine 122 as depicted in FIG. 3. The semantic classifier 16 and/or sentiment module 17 assist and support an agent routing strategy 12 (shown in FIG. 2). In various embodiments, the semantic engine 112 can be leveraged by the contact enricher 7 (shown in FIG. 2) to analyze the text or voice data provided by the communication channels or by external LVCSR/ASR Systems 2 (i.e., Large Vocabulary Continuous Speech Recognition/Automated Speech Recognition) to provide an automatic or semi-automatic management of contact events and to provide or generate data for handling of contact events.

As discussed in more detail herein, the semantic engine 112 can rank and suggest relevant information and documents for contact event handling via a semantic search and discovery module 18 (shown in FIG. 3) that indexes information stored in knowledge bases 305 (shown in FIG. 3). A semantic classifier module 16 (shown in FIG. 3) can apply one or more types of classification to communication data, which can include identification of information used later by service queue router 9 (shown in FIG. 2) and can include generation of classifications used internally by the business rule engine 22 (shown in FIG. 4) or used externally by the CRM system 310 (shown in FIG. 3). As shown in FIG. 3, the semantic classifier 16 can use a classification logic repository 19 and an ontology repository 20 to perform concept extraction and inference to determine if text data or voice data indicates or corresponds to a defined customer need.

For example, in various embodiments, the system server 110 can be configured to apply semantic analysis to text data or voice data received in association with a contact event, which can include text data or voice data sent by a user device 110 via any suitable communication channel 205, 210. Such data can include voice data that has been converted into text or voice or text data communicated from an agent device 130. Accordingly, text or speech that is communicated by a user via a user device 110, or communicated by a service agent via an agent device 130, can receive semantic analysis. Results of such a semantic analysis can be used in handling a contact event at any stage of the contact event.

Semantic analysis can be of any suitable form, including, but not limited to, formal semantics such as determining logical aspects of meaning, such as sense, reference, implication, and logical form; lexical semantics, which can include determination of word meanings and word relations; and/or conceptual semantics, which include determination of the cognitive structure of meaning. In various embodiments, semantic analysis refers to any meaning-driven intelligence. For example, when a user sends an e-mail to the system server 120, semantic analysis can be used to determine what the user wants, and other context that can include the emotional state of the user. Determining what a user wants or what a user's issue can be done by comparing the text, or comparing the meaning of the text, to a plurality of classified resolutions, issues and/or topics and ranking these classifications based on a best-match to the text provided. In various embodiments, such classifications can be hierarchical, a list, or the like.

Emotional state semantic analysis can include a determination of whether the user is mad, upset, happy, excited, confused, frustrated, or the like. Additionally, emotional state can also be determined in relation to things. For example, the user may be angry at the company, may be frustrated with a specific product, may have questions about an account, may dislike a specific employee, or may be excited about a certain promotion.

Semantic engines, or the like, may be complex or simple and may include simple keyword identification, statistical analysis, or may include a more robust artificial intelligence (AI) module. For example, a neural network, associative memory, support vector machine, decision tree, Bayesian network, or the like may be trained via supervised or unsupervised learning to perform various tasks that are part of semantic analysis. Such an algorithm may be provided suitable training data of text that has been coded with emotional states, meaning, context and/or other suitable semantic data which trains the algorithm to perform semantic analysis on new input data.

Returning to FIG. 2, the system server 120 may also comprise a speech characterization module 3 that is operable to determine voice characteristics to further provide enrichment of the contact data and provide for improved handing of a contact event. In contrast to analyzing text that has been generated from speech data, speech data can be directly analyzed by a speech characterization engine to determine characteristics of the speech of a user. For example, speech characterization may be used to determine emotional state, age, gender, impairment due to drugs or alcohol, race, cultural background, or the like.

As discussed above, speech characterization, or the like, may be complex or simple, or may include a more robust artificial intelligence module. Such an algorithm may be provided suitable training data of speech that has been coded with speaker characteristics, emotional states, meaning, context and/or other suitable semantic or speech characterization data which trains the algorithm to perform speech characterization or semantic analysis on new input speech data.

Returning to FIG. 2, the contact status repository 8 stores contact events and information about contact event state for the duration of the contact event. The contact status repository 8 can be consumed by a service queue router 9 that makes determinations based on information from the contact status repository 8 and can route a contact event to a selected Automatic Contact Distribution (ACD) address 10. ACD addresses 10 map agents associated with certain semantic analysis outputs that may be selected for a given contact event by the service queue router 9. For example, a contact event is queued to an ACD address 10 by the service queue router 9 depending on many factors such as contact event priority and contact event topic attributes, contact event emotional attributes, or the like. Each ACD address 10 component provides information about the number of contacts queued, last contact queued and agent devices 130 logged on to the system server 120 and agent devices 130 indicated as being active or ready to receive a contact event.

A service queue monitor module 44 is operable to monitor the states of service queues, which can provide a unified view of the channel hub 121. Such a unified view may be useful to a supervisor or administrator of the system server 120. The service queue monitor module 44 receives information from the ACD addresses 10 components that can include queue load, saturation and the global agent state. An ACD blending manager broker module 11 can play a role of intermediary among ACD addresses 10 by using information provided by an agent skill repository 13, agent routing strategy 12 and ACD addresses 10 in order to select an agent and route a contact event to a selected agent device 130. The agent skill repository 13 can store information about the skills and attributes of a plurality of agents.

In various embodiments, it may be desirable to select an agent to handle a given contact event based on various characteristics of the contact event. For example, a company that provides cable television service may receive contact events from customers who want to modify their account (e.g., change their services, add a subscription package, or the like) and the company may also receive contact events from customers that want to troubleshoot hardware. Some agents may have a more technical background and proficiency with such systems that are better suited to solving and troubleshooting hardware difficulties, and such agents may be selected when a determination has been made that a contact event relates to hardware difficulties. On the other hand, other agents may be specialized and have deep knowledge of the services and packages available from the company and may be better suited to handle account modification contact events. Similarly, some agents may be better suited to handle contact events where the customer is irate, and such agents may be selected when a determination has been made that a given contact event involves an irate customer. Additionally, an agent may be matched with a contact event based on gender, age, demographic, race, and/or ethnicity of a customer associated with a given contact event.

In some embodiments, service agents may handle contact events exclusively for a single company, whereas in other embodiments, service agents may handle contact events for a plurality of companies. For example, the system server 120 may support communication event handling for a plurality of companies that provide cable television services, and instead of services agents only handling contact events from one of these companies, service agents may handle contact events from both of these companies. This may be desirable because service agents can therefore specialize in certain types of service events or certain types of customers, where the system server 120 can allow service agents to more easily adapt to differences in contact event handling between companies.

Referring again to FIG. 2, an ACD blending manager broker module 11 can give priority to different communications channels 205, 210 of the network 160. In some embodiments a priority rule may include giving a higher priority to voice channels 210 over text channels 205. In another embodiment, top priority may be given to synchronous contact events (e.g., a phone call or online chat); lower priority to semi-synchronous (e.g., social network posts or messages) and lowest priority to asynchronous contact events (e.g., e-mail, SMS).

For example, in various embodiments a given agent may be allowed to handle a plurality of semi-synchronous or asynchronous text-based contact events because such contact events may include substantial time between messages of the agent and customer. However, for synchronous contact events, the agent may be required to address this contact event immediately over semi-synchronous or asynchronous contact events because synchronous contact events like a phone call or chat require continuous and real-time contact with a customer. In other words, the ACD blending manager broker module 11 can be configured to synchronize the contact events from various telephony servers and intermediate assignment of the contact event to a service agent and prioritize events.

Additionally, the ACD blending manager broker module 11 may act as broker between an Automatic Call Distributor and/or an Interactive Voice Response (ACD/IVR) module 215 and ACD Addresses 10 to affect the contact event assignment. For example, a user may initiate a voice contact event with the system server 120 and first encounter an ACD/IVR module 215, which may be associated with any of the servers 120, 140, 150 in accordance with various embodiments. The user may use voice, button or other inputs to select various portions of an audio menu provided and such selections may be used in a determination of an agent that is best suited to handle the contact event. For example, a user may hear a menu that inquires about the nature of the user contact. The menu can ask the user if he has a billing inquiry or if he has a shipping inquiry, and the user may be able to speak a selection or push a button on the user device 110 to select one of the two options. Such a selection may be part of the contact event data that is used to select a suitable agent.

The soft phone module 14 (shown in FIG. 4) can be a software phone and communication component that is used by an agent device 130 to communicate an operational state to the ACD blending manager broker 11 that will assign a contact event to an agent device 130. For example, in various embodiments, an agent may be assigned up to a certain number of semi-synchronous or asynchronous contact events simultaneously and up to one synchronous contact event at a time. An agent device 130 that has reached its maximum allowed state may report an unavailable operational state and not be assigned additional contact events or contact events of a certain type. Additionally, if no agents are logged into a given agent device 130 or if an agent indicates unavailability due to being on a break, wanting to take a break, or end of a shift, the operational state of the agent device 130 may be reported as unavailable.

As shown in FIG. 4, a business integration services module 27 provides integration components and Enterprise Application Integration (EAI) patterns implementation, and is configured to retrieve, transform and store business data, via data source connectors 28.

The data source connectors 28 can be software components configured to realize an interface to existing applications, services, and database systems, such as legacy systems 415 including, but not limited to, billing 420, fidelity 425, ERP 430, provisioning 435 and/or the customer details repository 315 and CRM 310 (shown in FIG. 3).

A virtual meta model module 29 can be an abstraction layer of metadata of business objects providing a renderer 37 and a decision controller 32 the ability to treat business data in a uniform way, regardless of the data source connector 28 that produced or retrieved the data. The decision controller 32 can be a controller that handles business and user interface (UI) events, and executes transactional actions stored in a dedicated controller repository 31 used to customize UI events by writing business event handlers to react both to front-end and back-end events.

The adaptive app engine component 123 is configured to host a unified adaptive user interface 36 that provides, updates and configures a user interface 800 (shown in FIGS. 8-11) for the agent device 130 via an internet browser or other suitable dynamic presentation technologies, using the renderer 37. The user interface 800 can be initially rendered using the information provided by an agent role repository 410 (that may be present on the service center server 140 or other server 120, 150 in some embodiments), the agent profile repository 38 and/or the UI model repository 35. The user interface can be dynamically adapted by a business rule engine 22 and a business process manager 26.

The UI model repository 35 can store definitions of dynamic views of the data and the external systems that can be expressed in a generic user interface modelling language. External systems can be modeled in data source connectors 28. The business rule engine 22 can be configured to express business rules that affect the behavior of the user interface 800 (e.g., combining knowledge from business data with the semantic concepts extracted by the AI semantic engine 122 (shown in FIG. 3)). A meta model enrichment rule repository 23 can store and define rules that express enrichment of business data according to business analysis. A UI model rule repository 24 can store and define rules that condition user interface presentation according to a defined operational flow. A process selection rule repository 25 can store and define rules that select the possible business processes in the operational flow, according to a contact event classification that is determined by the semantic engine 122.

A business process manager module 26 can be configured to be a workflow and business process management engine that enables one or more agent devices 130 to perform either human tasks (by an agent operator) or automated activities (by an AI process or rule based automation) to complete a business process. A process definition repository 30 can store and define a plurality of business process definitions that may be expressed in standard business process notation or other suitable format.

The agent profile repository 38 stores the agent profiles, which may include an agent skill set, or the like. Additionally, the system server 120 integrates with the external agent role repository to gain information about agent authentication and authorization.

A semantic contact history repository 33 may be configured to collect information about the entire contact event lifecycle beginning from the engagement of the user via a user device 110 through a communication channel 205, 210 of the network 160 up to the contact event closure including all the intermediate steps addressing and handling the contact event as described herein. A multichannel semantic Business Intelligence (BI) module 34 can be configured to act as an internal BI dashboard that generates analysis and report views of the information stored by the semantic contact history repository 33, external legacy systems 415 and the like. The BI module may be a hosted on any of the servers 120, 140, 150 in accordance with various embodiments.

Figure 5:
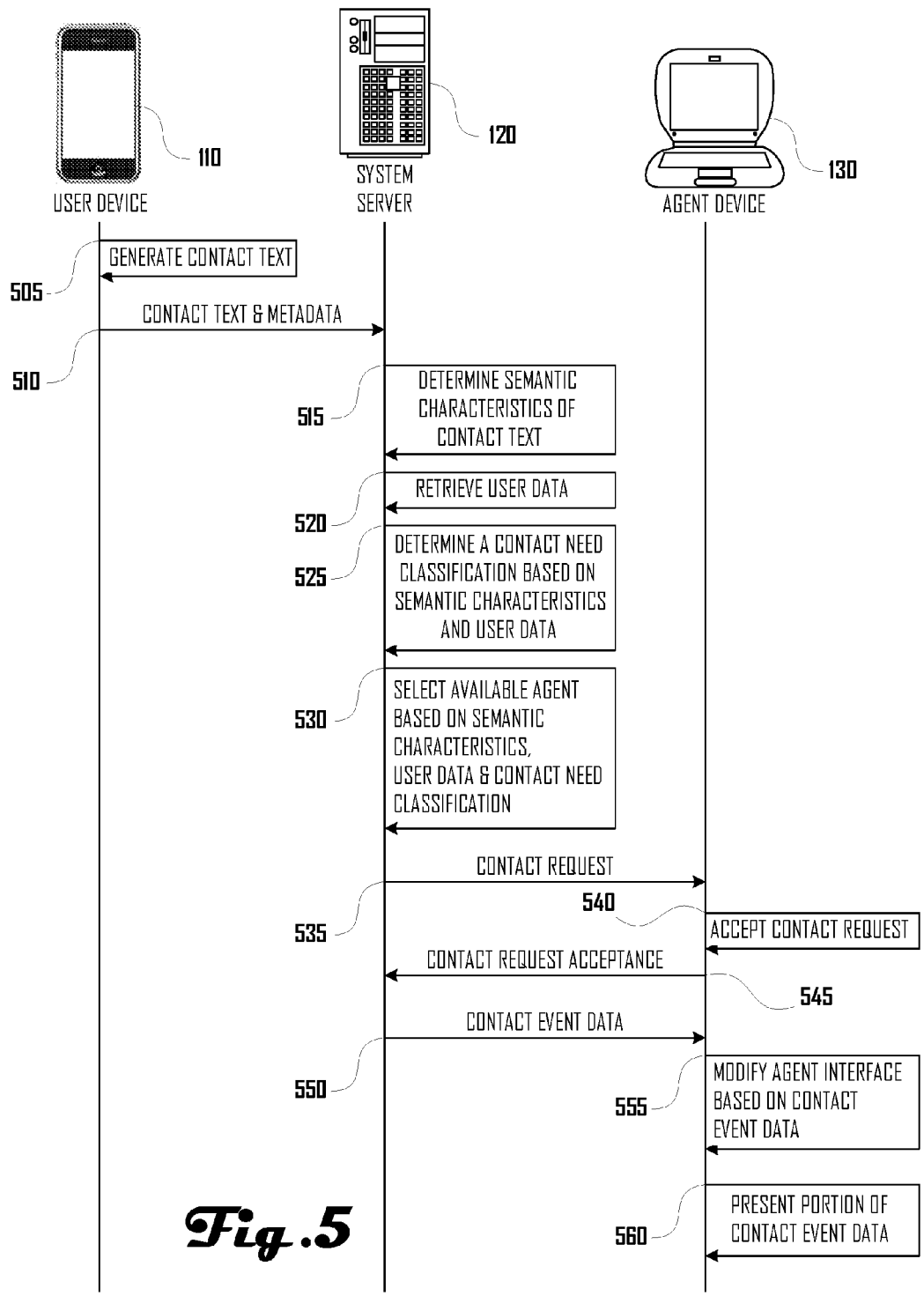
FIG. 5 is a data flow diagram illustrating example communications supported by the customer service system of FIG. 1a, wherein the communications occur among the user device, system server, and agent device during a text-based user contact event.

FIG. 5 is a data flow diagram illustrating example communications between the user device 110, system server 120, and agent device 130 during a text-based user contact event.

The communications begin, at 505, where contact text is generated at the user device 110 and sent to the system server 120 along with contact text metadata, at 510. For example, as discussed herein, a user (or customer) may initiate a contact event by sending an e-mail, sending an SMS text message, making a post on Facebook, sending a tweet, or the like. Contact metadata may include a user name, account number, phone number, e-mail address, time-stamp, IP address, or the like.

At 515, semantic characteristics of the contact text are determined and, at 520, user data is retrieved. In accordance with some embodiments, user data may be retrieved in various ways. In one embodiment, a user profile may be identified based on the contact text and/or the contact metadata. For example, a user may indicate an account number, user name, or the like in the contact text, and this information may be used to identify a user profile associated with the user that sent the contact text. Contact metadata may also include information that can be used to lookup or search for a user profile. Accordingly, a user profile may include data such as one or more user name, e-mail address, phone number, account number, account profile, and the like. A user profile may be stored on any of the servers 120, 140, 150 in various embodiments.

Returning to the communications, a contact need classification is determined, at 525, based on the semantic characteristics and the user data. In some embodiments, there can be a plurality of hierarchical need classifications that correspond to various needs, issues or problems that users may have and/or that can be addressed by a service agent via an agent device 130. For example, such need classifications may be general such as billing issues, complaints, technical questions, or the like. Need classifications may also be specific to certain products, geographic locations, promotions, marketing campaigns, complaints, or the like. As discussed herein, one or more classification need can be selected and presented based on a best-match comparison to the semantic characteristics and/or user data.

At 530, a service agent is selected based on a need classification, semantic characteristics and user data. For example, as discussed herein, certain skills or attributes of certain service agents may make these service agents better capable than other service agents of handling certain contact events, and therefore a most desirable service agent can be selected based on characteristics of a contact event, a need classification, semantic characteristics and/or user data. Selection may also be based on other factors, including agent availability, agent workload, or the like.

In various embodiments, it may be desirable for actions to occur automatically without user action or intervention. For example, instead of requiring a human operator to facilitate semantic analysis of text or voice data received from a user device 110, identify a user account associated with a contact event, classify a customer need, or provide a service agent with information useful in handling a contact event, it may be desirable for the system server 120 to automatically perform some or all of these functionalities without operator interaction. Accordingly, fewer operators may be required to handle contact events and relevant data and updates to an agent interface may be provided faster than if human operators are involved in such steps. Therefore, in accordance with some embodiments, any of the steps or functionalities discussed herein may be suitably performed without human interaction or intervention.

At 535, a contact request is sent to the agent device 130, where the contact request is accepted, at 540. A contact request acceptance is sent back to the system server 120, at 545, and contact event data is sent to the agent device, at 550. Contact event data can comprise any data associated with a contact event including a need classification, semantic characteristics, user data, contact text, contact metadata, agent interface data, and the like.

At 555, an agent interface at the agent device 130 is modified based on the contact event data, and, at 560, a portion of the contact event data is presented. Agent interfaces, modification of agent interfaces, and presentation of contact event data are discussed herein in reference to FIGS. 8-11.

Figure 6:
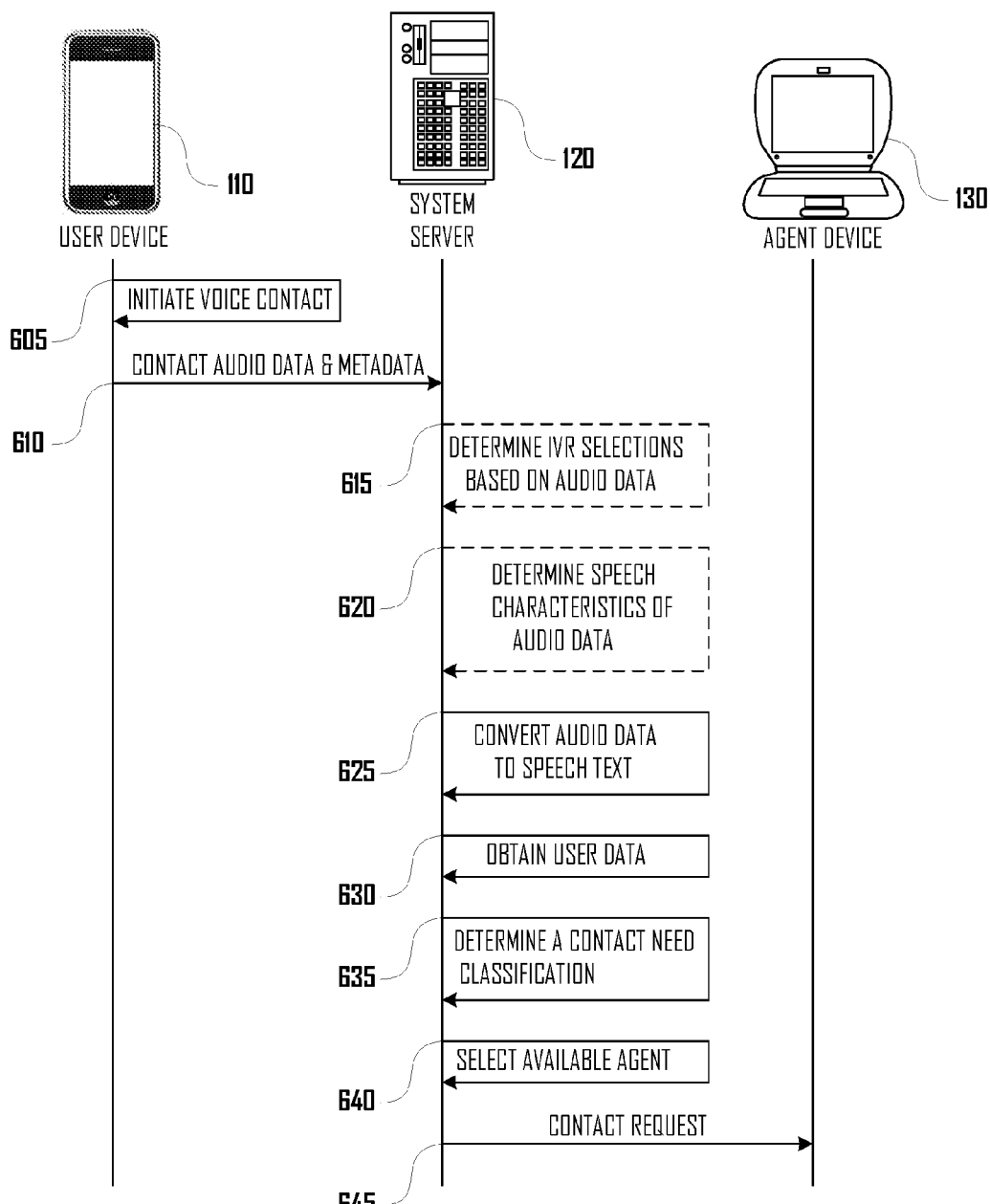
FIG. 6 is a data flow diagram illustrating example communications supported by the customer service system of FIG. 1a, wherein the communications occur among the user device, system server, and agent device during a voice-based user contact event.

FIG. 6 is a data flow diagram illustrating example communications between a user device 110, system server 120, and agent device 130 during a voice-based user contact event. The communications begin, at 605, where a voice contact is initiated and contact audio data and contact metadata is sent to the system server 120. For example, as discussed herein, a user device 110 may communicate with the system server 120 via phone, VOIP, video, or the like, which may include audio data. Such audio data may be received in real-time or may be received on a delay (e.g., as a voicemail message or e-mail attachment). Additionally, such contact data may include contact metadata such as a user name, account number, phone number, e-mail address, time-stamp, IP address, or the like.

In an optional step, at 615, IVR selections are determined based on the audio data. For example, a user can optionally be presented with an IVR menu and make various selections as discussed herein. In another optional step, at 620, speech characteristics of the audio data are determined. At 625, audio data is converted to speech text, which may be done in real time or on a delayed basis depending on hardware and/or software capabilities.

At 630, user data is obtained. In accordance with some embodiments, user data may be retrieved in various ways. In one embodiment, a user profile may be identified based on the speech text, audio data and/or the contact metadata. For example, a user may indicate an account number, user name, or the like in the audio data, and this information may be used to identify a user profile associated with the user that provided the audio data. Contact metadata may also include information that can be used to lookup or search for a user profile.

At 635, a contact need classification is determined. The contact need classification may be based on semantic characteristics, speech characteristics, IVR selections and/or user data. Semantic characteristics may be determined based on semantic analysis of the speech text or direct semantic analysis of the audio data.

At 640, an available service agent is selected based on a need classification, semantic characteristics, speech characteristics, IVR selections and/or user data. For example, as discussed herein, certain skills or attributes of certain service agents may make these service agents better capable that other service agents of handling certain contact events, and therefore a most-desirable service agent may be selected based on characteristics of a contact event, including a need classification, semantic characteristics, speech characteristics, IVR selections and/or user data. Selection may also be based on other factors, including agent availability, agent workload, or the like. At 645, a contact request is sent to the agent device 130. In various embodiments, further communications can include the communications like those depicted at 545, 550, 555 and/or 560 of FIG. 5.

Figure 7:
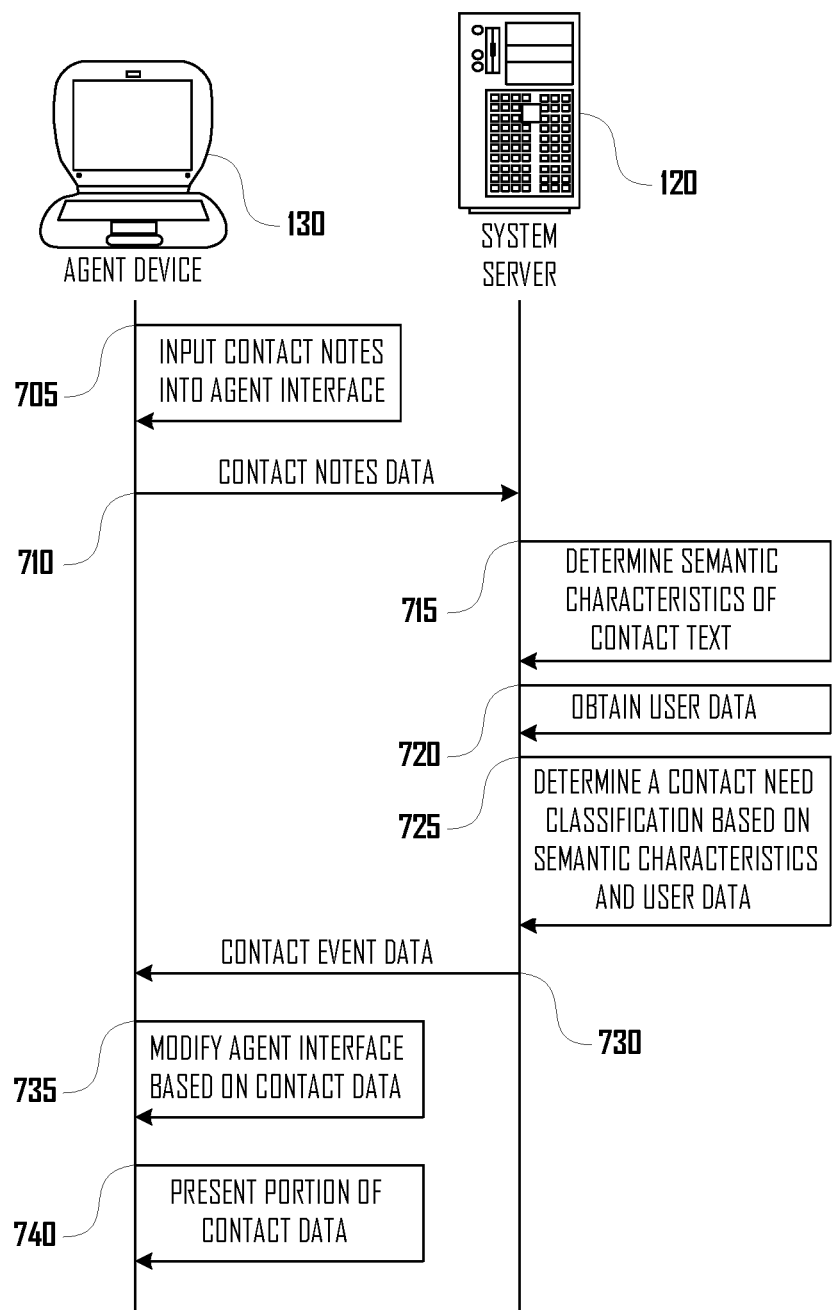
FIG. 7 is a data flow diagram illustrating example communications supported by the customer service system of FIG. 1a, wherein the communications occur among the system server and agent device during a user contact event.

FIG. 7 is a data flow diagram illustrating example communications between the system server 120 and agent device 130 during a user contact event. The communications begin at 705, where a service agent inputs contact notes into an agent interface, and, at 710, contact notes data is sent to the system server 120. At 715, semantic characteristics of the contact text are determined, and, at 720, user data is obtained. A contact need classification is determined, at 725, based on semantic characteristics and user data, and, at 730, contact event data is sent to the agent device 130. At, 735 the agent interface is modified based on the contact data, and, at 740, a portion of the contact data is presented.

For example, in some embodiments, a text, audio or video-based contact event may be assigned to a service agent before semantic characteristics, user data, and a need classification can be determined by the system server 120, or data may not be available to determine or obtain semantic characteristics, user data, and/or a need classification. Additionally, it may be desirable to update such data even where semantic characteristics, user data, a need classification, and the like has been determined or generated. Accordingly, data that is input into an agent device 130 may be processed during a contact event to update or generate semantic characteristics, user data, a need classification, or the like. This may be desirable because as more information becomes available during a contact event, or needs change during a contact event, the system server 120 can adapt to such changes and additional information.

In some embodiments, an agent interface may comprise a notes field, wherein the agent can type notes, impressions or search queries that can be processed by the system server 120. In further embodiments, text data, audio data, or video data may be processed in real-time or on a delayed basis during any phase of a contact event, which text data, audio data, or video data may include text data, audio data, or video data generated by the user or the agent.

Monitoring communications made by a service agent may be desirable for quality control of contact event handling and to assist a service agent during a contact event. For example, where a service agent makes communications that are perceived to be hostile or angry, a supervisor can be alerted to intervene during the contact event or at a later time.

Figure 8:
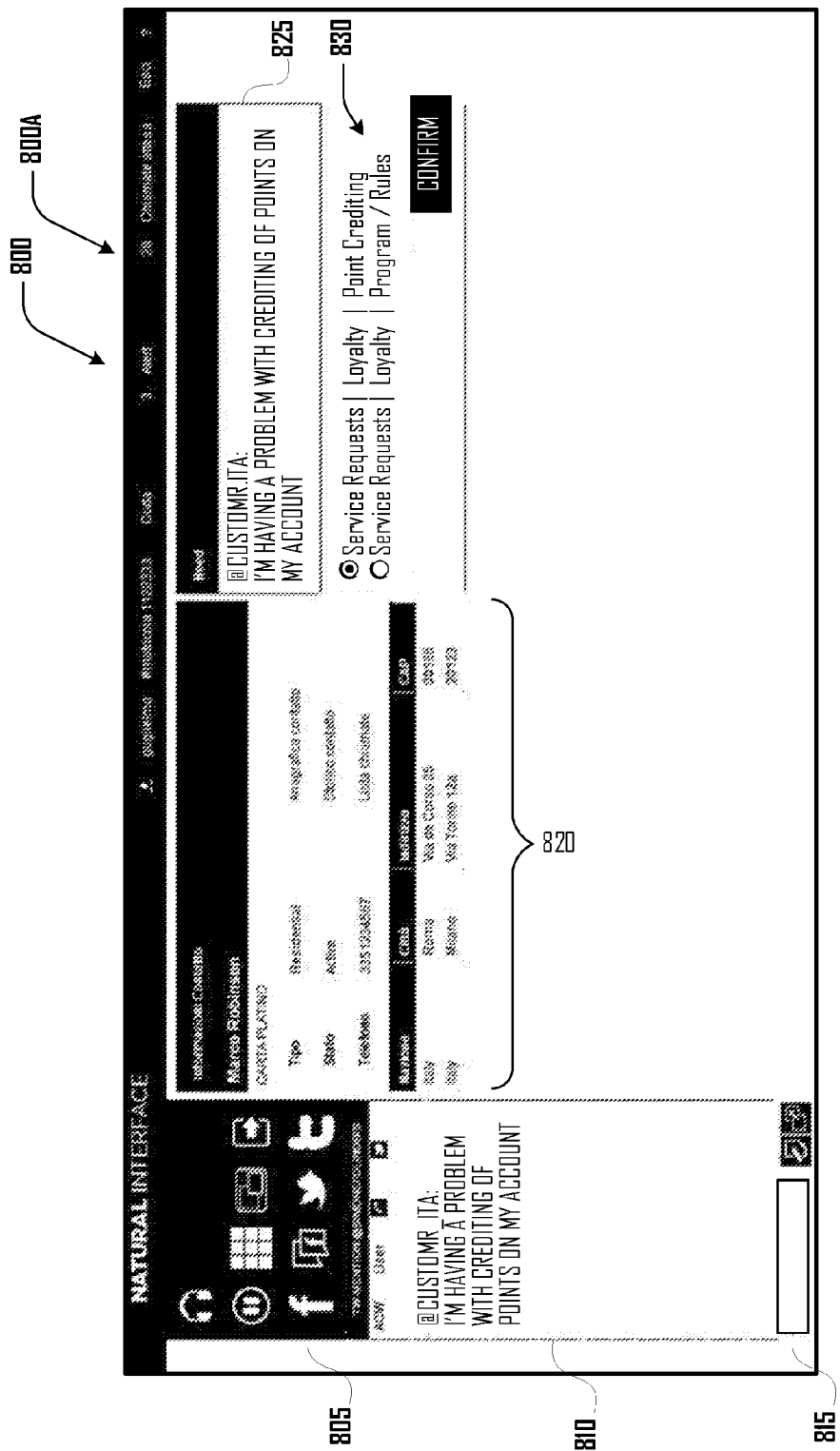
FIGS. 8-11 illustrate exemplary embodiments of an agent interface for the agent device of FIG. 1.

FIGS. 8-11 illustrate various embodiments of an agent interface 800 in accordance with embodiments 800A, 800B, 800C, 800D. Turning to FIG. 8, one embodiment of the interface 800 comprises a communication channel field 805 that can display a plurality of possible communication channels. The interface 800 also includes a text communication field 810 and a text input field 815 that allows a service agent to input a reply message to a user. For example, as depicted in FIG. 8, a customer has sent a tweet to the system server 120, and the contact event is assigned to an agent device 130 that presents the text of the tweet in the text communication field 810.

The interface 800 may also comprise a user data presentation field 820 that may display available user data that may be present in a user profile or that may be input by the service agent. For example, in some embodiments, user data may be dynamically gathered by the system server 120 by querying the company server 150, including legacy systems 415, or the like. The interface 800 can also include a need field 825 and a need classification selection field 830. For example, as discussed herein, one or more need classification may be determined based on user data, contact metadata, contact text, semantic characteristics, speech characteristics, a determined meaning of contact text, or the like. As depicted in FIG. 8, two need classifications can be presented to the agent, and the agent may select a need classification, which may provide the agent with additional information, functionalities, assistance or resources as depicted in FIGS. 9-11.

Figure 9:
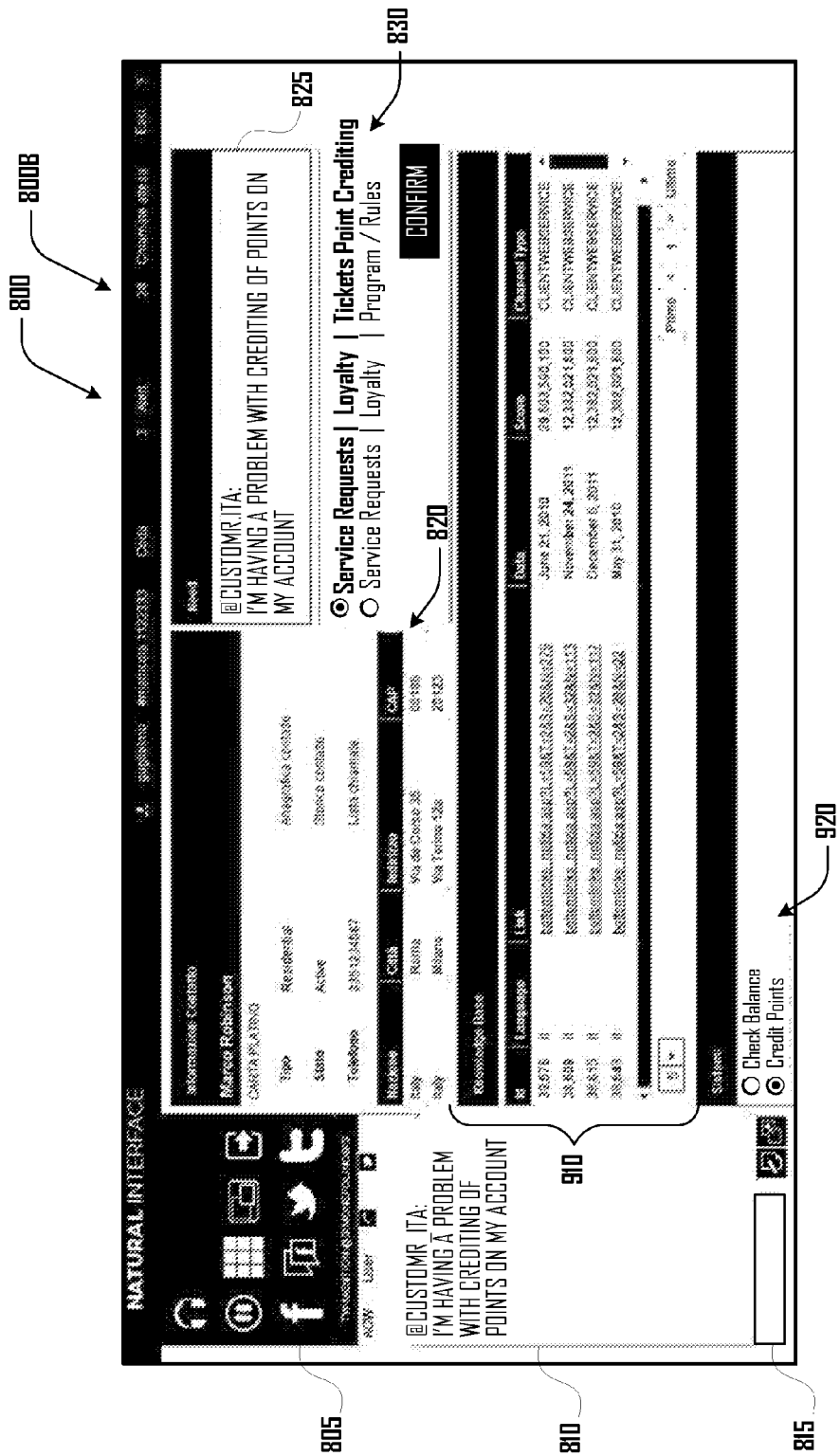

Turning to FIG. 9, another embodiment 800B of the interface 800 is depicted, wherein the agent has selected a displayed need classification 830 (shown in bold), which selection causes a knowledge base field 910 to be displayed that provides links to various documents, guides, instructions or other information that is relevant to the selected need classification. Such a need classification 830 selection further drives the customer need resolution based on other data, including channel type, user profile data, or the like. Accordingly the knowledge base field 910 displays links, or the like, based on semantic text analysis. Additionally, a system field 920 is presented that provides for access to system functionalities that allow the service agent to address or resolve the user need as depicted in FIGS. 10 and 11.

Figure 10:
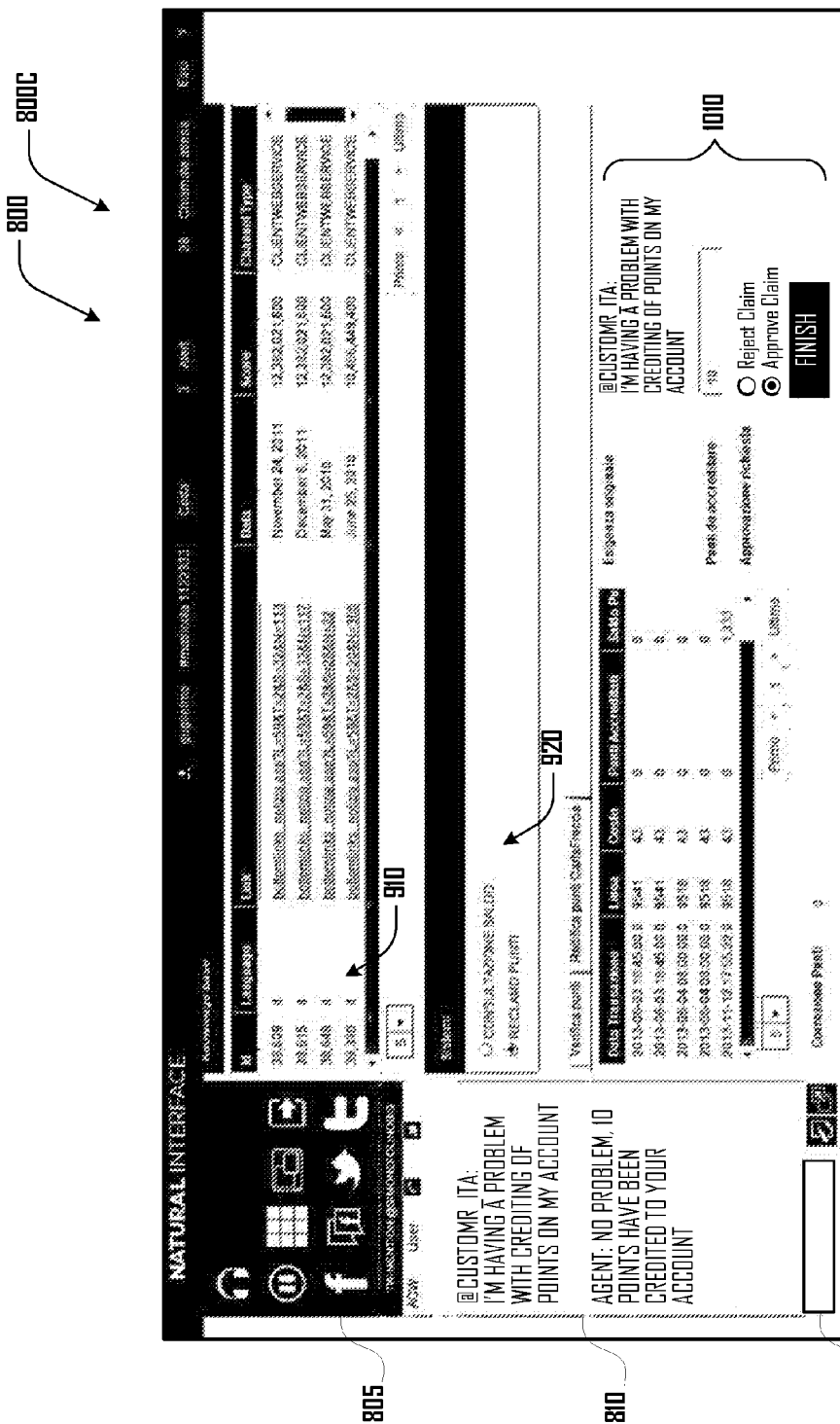
Figure 11:
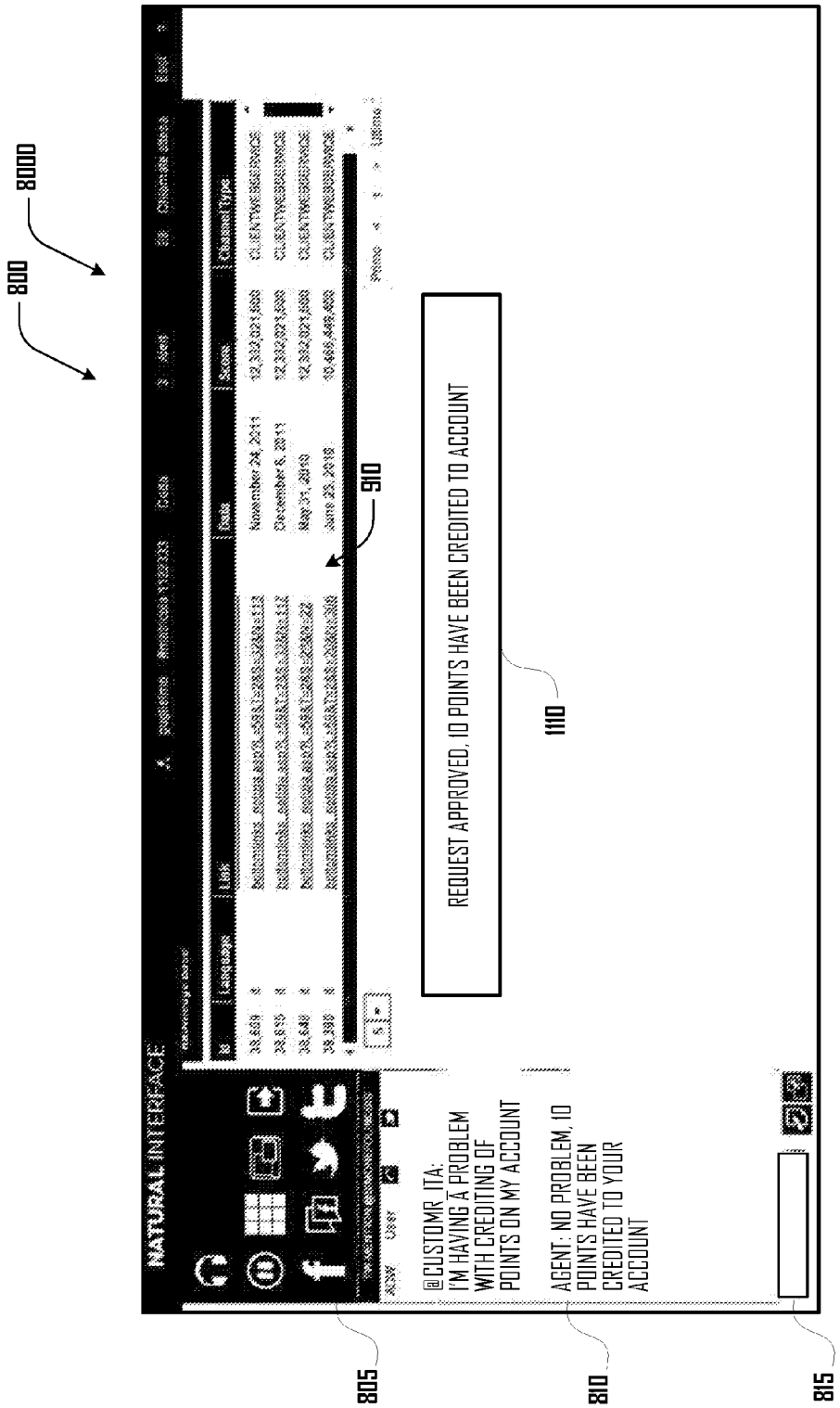

Turning to FIG. 10, a system resolution field 1010 is illustrated that allows the service agent to resolve the user need. For example, as depicted in FIGS. 8-11, the user is having difficulty with having points credited to her account, and the agent can use the agent interface 800 to view the user's point balance and account history. The service agent can choose to approve or reject a user claim based on the service agent's judgment and, as depicted in FIG. 11, where the service agent approves a claim, the agent interface can present a confirmation 1110 to confirm the selected resolution of the customer need and the contact event 810.

In various embodiments, the service agent may reply to a customer via the same communication channel that the customer originally initiated the contact event from. For example, as depicted in FIGS. 10 and 11, where a customer initiated a contact event via Twitter, the service agent may tweet a response to the customer via Twitter as depicted in the text communication field 810. However, in some embodiments, the service agent may reply to a customer via another communication channel.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for customer contact handling at a customer service system, comprising:
    receiving, at a system server, contact text and contact metadata from a user communication device;
    determining, at the system server, semantic characteristics of the contact text based on semantic analysis of the contact text;
    identifying, at the system server, a user profile based on the contact metadata;
    retrieving, at the system server, user data associated with the identified user profile;
    determining, at the system server, a contact need classification based on the semantic characteristics and user data;
    selecting, at the system server, a service agent profile from a plurality of service agent profiles based on one or more of the contact need classification, semantic characteristics, and user data;
    initiating, by the system server, a contact event with an agent communication device associated with the selected service agent profile; and providing, by the system server, contact event data to the agent communication device.

2. The method of claim 1, wherein said identifying the user profile is further based on the contact text.

3. The method of claim 1, further comprising modifying a contact event interface at the agent communication device based on the contact event data.

4. The method of claim 1, further comprising modifying a contact event interface at the agent communication device based on the user data and the contact need classification.

5. The method of claim 4, wherein said modifying the contact event interface comprises presenting at least a portion of the user data and the contact need classification.

6. The method of claim 1, further comprising:
 receiving contact event note data from the user communication device; and
 determining semantic characteristics of the contact event note data based on semantic analysis of the contact event note data.

7. The method of claim 1, further comprising:
 receiving contact event text correspondence data; and
 determining semantic characteristics of the contact event text correspondence data based on semantic analysis of the contact event text correspondence data.

8. A customer service system comprising:
 a memory device configured to store machine-readable instructions; and
 a computer system including one or more processing devices, in response to executing the machine-readable instructions, configured to:
  receive contact text and contact metadata from a user communication device;
  determine semantic characteristics of the contact text based on semantic analysis of the contact text;
  identify a user profile based on the contact metadata;
  retrieve user data associated with the identified user profile;
  determine a contact need classification based on the semantic characteristics and user data;
  select a service agent profile from a plurality of service agent profiles based on one or more of the contact need classification, semantic characteristics, and user data;
  initiate a contact event with an agent communication device associated with the selected service agent profile; and
  provide contact event data to the agent communication device.

9. The system of claim 8, wherein to identify the user profile the computer system is further configured to identify the user profile based on the contact text.

10. The system of claim 8, wherein the computing system is further configured to modify a contact event interface at the agent communication device based on the contact event data.

11. The system of claim 8, wherein the computing system is further configured to modify a contact event interface at the agent communication device based on the user data and the contact need classification.

12. The system of claim 11, wherein to modify the contact event interface the computing system is to present at least a portion of the user data and the contact need classification.

13. The system of claim 8, wherein the computing system is further configured to:
 receive contact event note data from the user communication device; and
 determine semantic characteristics of the contact event note data based on semantic analysis of the contact event data.

14. The system of claim 8, wherein the computing system is further configured to:
 receive contact event text correspondence data; and
 determine semantic characteristics of the contact event text correspondence data based on semantic analysis of the contact event text correspondence data.

15. A method for customer contact handling at a customer service system, comprising:
 receiving, at a system server, contact audio data and contact metadata from a user communication device;
 determining, at the system server, semantic characteristics of the contact audio data based on semantic analysis of the contact audio data;
 identifying, at the system server, a user profile based on the contact metadata;
 retrieving, at the system server, user data associated with the identified user profile;
 determining, at the system server, at least one contact need classification based on the semantic characteristics and user data;
 selecting, at the system server, a service agent profile from a plurality of service agent profiles based on one or more of the contact need classification, semantic characteristics, and the user data;
 initiating, by the system server, a contact event with an agent communication device associated with the selected service agent profile; and
 providing, by the system server, contact event data to the agent communication device.

16. The method of claim 15, further comprising determining speech characteristics of the contact audio data.

17. The method of claim 15, wherein determining the semantic characteristics of the contact audio data comprises generating contact text based on the contact audio data.

18. The method of claim 15, wherein said identifying the user profile is further based on the contact audio data.

19. The method of claim 15, further comprising modifying a contact event interface at the agent communication device based on the contact event data.

20. The method of claim 15, further comprising:
 receiving contact event note data from the user communication device; and
 determining semantic characteristics of the contact event note data based on semantic analysis of the contact event data.

* * * * *